R. W. Morse,
Centering Chuck,
No. 56,981.  Patented Aug. 7, 1866.
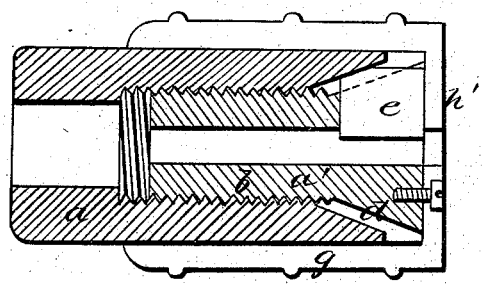
Witnesses:
E. W. Bliss
Jeremy W. Bliss
Inventor:
Rufus W. Morse

UNITED STATES PATENT OFFICE.

RUFUS W. MORSE, OF EAST BERLIN, CONNECTICUT.

IMPROVEMENT IN CHUCKS.

Specification forming part of Letters Patent No. 56,981, dated August 7, 1866.

*To all whom it may concern:*

Be it known that I, RUFUS W. MORSE, of East Berlin, county of Hartford and State of Connecticut, have invented certain new and useful Improvements in Self-Centering Chucks; and I do hereby declare that the same is described and represented in the following specification and drawing; and to enable others skilled in the art to make and use the same, I will proceed to describe its construction and operation by referring to the drawings, in which the same letters indicate like parts in each of the figures.

The nature of this improvement will be understood from the specification and drawing, in which is shown a sectional view.

*a* is the stock proper, which is designed to be fitted to the spindle of a lathe in the usual way, in the outer ends of which are cut or formed grooves, into which the two sides and one edge of the jaws *e* are fitted so as to work closely and freely therein in a line at right angle with a center line with the chuck, the front edge of which works against the plate *h'* of the case *g*. Said plate *h'*, with its case *g*, is secured to the outer end of the screw-stock *a'*, thus closing up the grooves and forming a box, in which the jaws *e* are fitted so as to work closely and freely back and forth in a plane at right angle with a center line of the chuck. The stock *a* is bored out through the center, having a thread, *b*, cut on its inner surface to receive the screw of the stock *a'*, and having its front end bored out conical shape, *d*, so that as the stock *a'*, by means of the case *g*, is turned up or into the stock *a*, the conical-shape formation *d* in the outer end of the stock *a* will compress the jaws *e* firmly against a drill or other material placed therein.

Now, in the use of this chuck it is believed it will be only necessary to have the back end of the drill slightly conical-shaped to insure its free entrance into the gripe of the jaws. Then, by turning the case *g*, the drill will become firmly fastened thereon.

I believe I have thus shown the nature, construction, and advantage of this improvement, so as to enable others skilled to make and use the same therefrom.

What I claim, therefore, and desire to secure by Letters Patent, is—

The combination of the case *g*, sliding jaws *e*, with the stocks *a a'*, substantially as and for the purpose described.

RUFUS W. MORSE. [L. S.]

Witnesses:
E. W. BLISS,
JEREMY W. BLISS.